Aug. 28, 1962        E. A. HENRY        3,050,989

CARRIER TECHNIQUE FOR WIDE RANGE ULTRASONIC INSPECTION

Filed Oct. 30, 1958        2 Sheets-Sheet 1

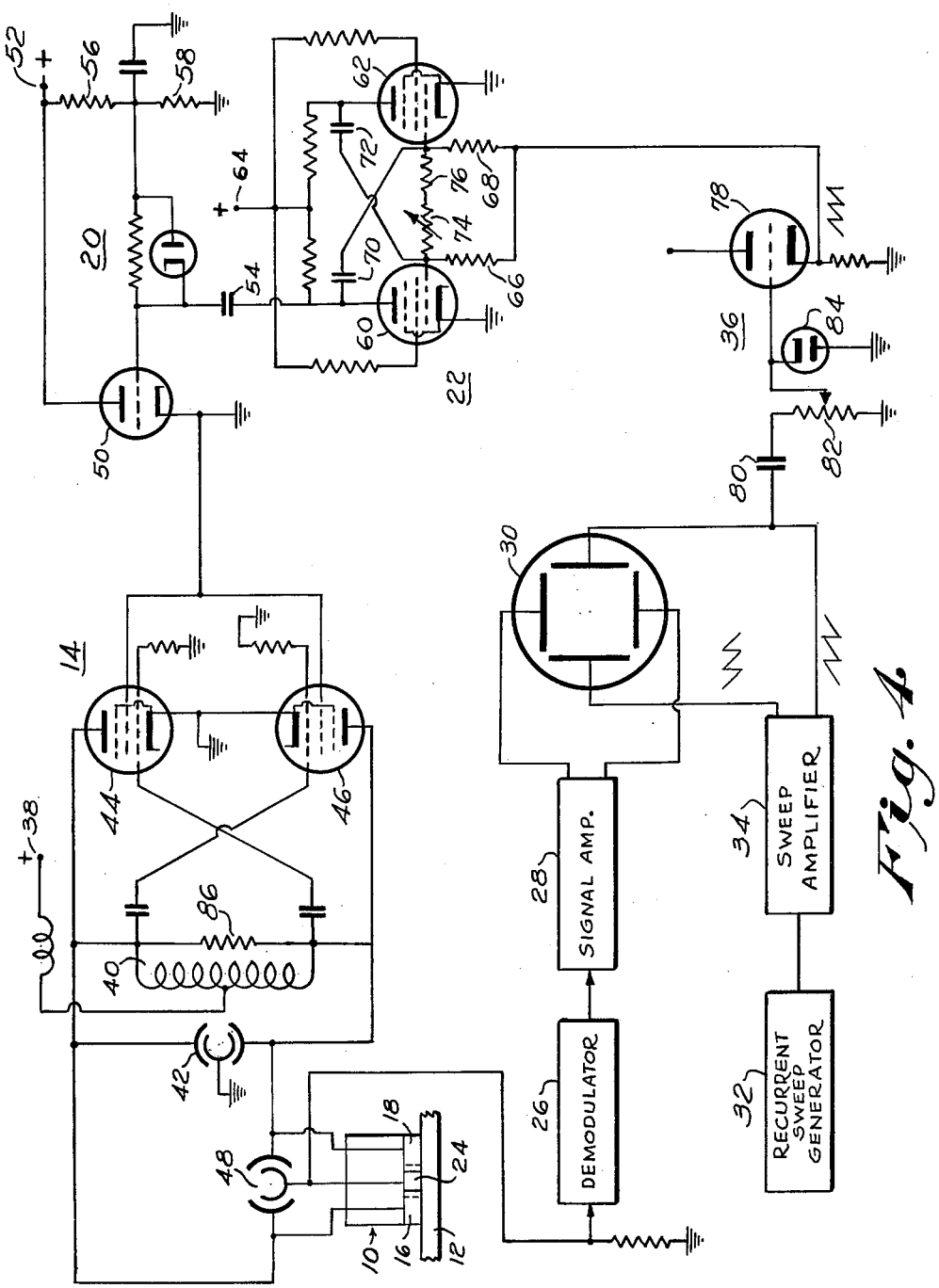

United States Patent Office 3,050,989
Patented Aug. 28, 1962

3,050,989
CARRIER TECHNIQUE FOR WIDE RANGE
ULTRASONIC INSPECTION
Elliott A. Henry, Newtown, Conn., assignor to Sperry
Products, Inc., a corporation of New York
Filed Oct. 30, 1958, Ser. No. 770,778
7 Claims. (Cl. 73—67.7)

This invention pertains to the inspection of materials by means of ultrasonic waves, and while the technique employed is of more general application, it will be described herein in connection with the measurement of the thicknesses of materials of which only one surface is conveniently accessible.

It is a well known fact that the thickness of a mechanical part or layer can be determined by establishing reverberating acoustic waves in the part or workpiece, and timing the reverberation interval for resonance conditions to indicate the thickness of the part. Such techniques are, for example, disclosed in the prior patent of Rassweiler and Erwin, No. 2,431,234 granted November 18, 1947. The theory underlying such procedures is based upon the fundamental relation between frequency, velocity and wavelength, according to which the frequency of vibration is equal to the velocity of propagation divided by the wavelength. For fundamental resonance in the thickness mode, the thickness will be equal to one-half the wavelength at the resonant frequency, and inasmuch as the propagation velocity is a constant for a given workpiece material, the thickness indicated will be a constant whose magnitude is equal to one-half the wave velocity in the material, divided by the resonant frequency. At the resonant frequency, the vibration amplitude in the workpiece will be at a maximum, as the incoming energy from the transducer will be in phase with the internal reverberations, and therefore additive.

As I have shown in my prior Patent No. 2,680,372, issued June 8, 1954, the assumption made by prior workers that resonance conditions in the workpiece can be indicated by the frequency at which maximum electrical load is imposed on the generator supplying the ultrasonic transducer, is an erroneous assumption. This is due to the fact that the load being supplied by the electrical generator (transducer) is not a pure resistance but has a reactive component in the case of piezoelectric transducers. For a full discussion of this subject, and a way of indicating true thickness mode resonance independent of the frequency of maximum loading of the generator, reference may be made to my copending application, Serial No. 770,779, filed October 30, 1958, and assigned to the owner of the present invention.

However, the solution covered by the application just mentioned has the limitation (in common with prior art techniques) that a plurality of different transducers are needed in order to permit the apparatus to operate over a wide range of workpiece thicknesses. This range restriction, in the case of the single transducer of prior art and the composite transducer disclosed in my prior application, is a result of interaction between the electric field applied to the crystal transducer and the crystal vibrations, the crystal vibration (and sensitivity) being proportional to the algebraic sum of the two sets of forces. The transducer sensitivity is at a maximum when it is driven at its fundamental frequency, and at a minimum when it is driven at a subharmonic frequency.

It is accordingly a principal object of the present invention to provide a system of the general character described above, but in which a single transducer can be utilized to cover a very wide range of values of workpiece thickness.

It is a further object of the invention to provide an improved system of ultrasonic measurement and gaging in which the range of thickness to be scanned can be rapidly and conveniently adjusted or selected, without recourse to connecting alternative transducers to the oscillatory generator.

It is still another object of the invention to provide a system of the above type in which frequency excursions of the generator are accomplished without the use of rotating or moving parts, and in which the frequency excursions can thus be rapidly altered from a few percent to as much as several octaves.

In general, the above and other objects of the invention are accomplished by a system using a single transducer of the type already described in my said copending patent application, in combination with novel energizing circuitry using a double modulated carrier technique to permit a wide range of frequency excursions, easily controllable, both for range switching and for sweeping within a selected range. Specifically, a single high frequency generator, driving the transducer, is amplitude modulated by a lower frequency, frequency-modulated wave, the amplitude modulation being essentially square-wave in character, and the frequency modulation being synchronized with the sweep frequency of an indicator such as a cathode ray oscilloscope or the like, which serves to indicate the condition of true resonance within the specimen or workpiece, and thereby the frequency at which such resonance occurs, this frequency in turn indicating the true thickness of the specimen.

The invention itself, by which the above results and advantages are accomplished, will best be understood by referring now to the following detailed specification of a preferred embodiment thereof, given by way of example and not for purposes of limitation. The description to follow makes reference to the accompanying drawings, forming a part hereof, and in which:

FIGURE 4 is a diagram, partly in block form as to known components, showing additional details of certain of the components of FIGURE 1.

Figure 1:
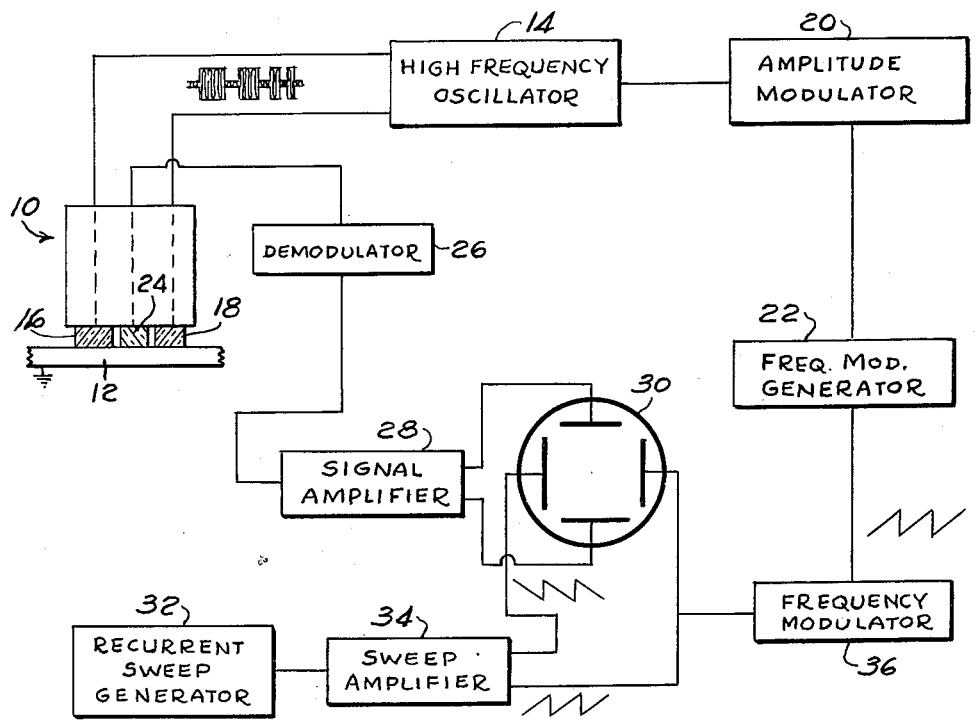
FIGURE 1 is a schematic diagram, mostly in block form, illustrating the entire system for ready understanding of the novel principles involved.

Basically, the system drives a composite transducer 10, whose common transmitting and receiving face is in coupled relation to one surface of the specimen or workpiece 12, from a high frequency oscillator 14 whose frequency is adjusted to the natural frequency of the transmitting crystals 16, 18 of the transducer. This relationship is fundamental to the principle of the invention, although, as will appear, the output of oscillator 14 to the transducer will contain sideband frequencies different from its fundamental. Thus, the output of oscillator 14 is amplitude modulated to a depth of 80 or 90 percent modulation, by the amplitude modulator 20, which is in turn controlled from the frequency-modulation generator 22. In other words, the repetition rate at which the output amplitudes of oscillator 14 successively goes to its maximum value is determined by generator 22, and is cyclically varying during each sweep cycle of the equipment. Hence, the output of high frequency oscillator 14 is a series of square pulses or trains of the carrier frequency, whose recurrence rate is established by the frequency modulated generator 22, and whose minimum amplitude level preferably does not drop to zero, but to some small value set by the amplitude modulator 20.

Figure 2:
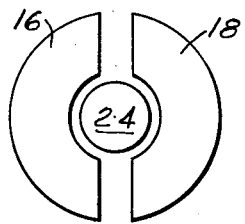
FIGURE 2 is a plan view of the crystal arrangement of the transducer employed with the invention.
Figure 3:
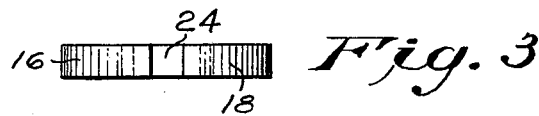
FIGURE 3 is a side elevational view of the same.

The output of oscillator 14 is balanced to ground or a common reference potential, in a manner to be described but more fully treated in my copending application mentioned above. The output connectors are connected to the respective transmitting crystals 16 and 18 of the transducer, the physical arrangement of these being shown in FIGURES 2 and 3. The receiving crystal 24 is symmetrically disposed with respect to the transmitting crystals, and its electrical output is connected to the demodulator 26 and the signal amplifier 28, and thence to the oscilloscope 30 to provide, for example, a vertical displacement corresponding to the energy reflected to crystal 24 from within the workpiece 12. As disclosed in my other application, this symmetrical transducer permits direct indication of the occurrence of resonance in the specimen.

The time axis of the oscilloscope 30, usually the horizontal axis of trace deflection, is supplied from the usual recurrent sweep generator 32, producing a sawtooth sweep output wave which is amplified as at 34 and applied to the opposite deflecting plates or other controls of the oscilloscope. Also, the sweep amplifier 34 provides a synchronizing output for the purpose of controlling the frequency modulator 36 and thereby to cause the recurring frequency swings applied to amplitude modulator 14 to be synchronized with the recurrent time-base sweeps of the oscilloscope, in a manner generally known and understood in this art.

The frequency range encompassed by FM generator 22 is a substantial one, for example encompassing a range of ten to one in frequency. Within this capability, the actual maximum and minimum frequencies employed are to be selected by the operator in accordance with the range of thicknesses with which he is concerned at the time. As will be pointed out, the maximum frequency excursion of generator 22 may be of the order of 2.3 megacycles per second, for a thickness measurement range of from one-tenth inch to ten feet in a steel specimen 12. This gives a maximum modulation frequency which is much lower than the fundamental frequency of oscillator 14 and the transmitting crystals 16, 18, matched at, for example, ten megacycles.

The detecting or receiving crystal 24 of transducer 10 is preferably arranged to have a natural frequency of the order of twice the natural frequency of the transmitting crystals 16 and 18; such a crystal has been found to have a low sensitivity for the ten megacycle carrier frequency employed, but good sensitivity for the modulation frequencies employed. As will be understood, the resonant workpiece frequencies to be sensed are correlated with the frequency provided by generator 22, and not with the frequency carrier of oscillator 14. This distinction is the basis for obtaining a very wide range of useful frequencies, for wide-range thickness measurements and the like, while utilizing a single transducer which operates satisfactorily in this combination for all of the modulation frequencies needed for this wide range.

Certain details of the required circuitry and arrangement are more clearly shown in the schematic diagram of FIGURE 4, to which reference will now be made. The same reference numerals are employed, so far as possible, as in FIGURE 1. Thus, the transducer assembly 10 has its transmitting crystals 16 and 18 coupled, as by usual plated or like electrodes, to the opposite sides of the balanced output from oscillator 14. The plate voltage supply for this oscillator is indicated at 38, and is connected to a center tap on the inductor 40 which, together with split-stator capacitor 42, constitutes the tank circuit for the oscillator. An RF choke in the plate supply lead maintains the center tap of the tank inductor 40 above the A.C. ground potential, permitting the neutral point of the tank circuit to be controlled by the grounded rotor of the tank capacitor 42. Anode current flows through the inductor 40 to the respective plate electrodes of the tubes 44 and 46, whose control grids are cross-coupled by capacitors, as shown, to form an oscillator of the push-pull type well known to those skilled in electronics. The split-stator capacitor 42 whose common rotor is grounded, provides an adjustable means for obtaining balance between the two push-pull output waves, despite minor variations in tube or wiring parameters. Likewise, a split-stator capacitor 48, connected at the transducer leads, aids in maintaining balance in a manner more fully described in my copending application mentioned above, and ensures that the output signal from receiving crystal 24 is immune to any electrostatically-coupled energy from the leads of the transmitting crystals or the crystals themselves. As disclosed in that application, the transmitter crystals 16 and 18 are assembled with opposite polarity, so that while they operate together or additively for mechanical excitation of the specimen 12, their electrical effects cancel insofar as they might otherwise couple energy directly into the receiving crystal 24 or its connections.

Amplitude modulation of the output of oscillator 14 is obtained by connecting the screen grid electrodes of the tubes 44 and 46 to the cathode of a cathode-follower amplitude modulation stage 20, the cathode-follower tube being designated 50 and receiving its space current from a source of D.C. voltage indicated at 52. Control voltages for this modulator are coupled to its grid circuit over a capacitor 54, from frequency-modulated generator 22. The use of a cathode follower for this stage provides the necessary bandwidth necessary to pass the relatively large frequency swing represented by the modulations to be described. The minimum value of the screen grid voltage applied to the tubes 44 and 46 is conveniently set by the voltage-dividing resistors 56 and 58, and the clamping diode connected across the grid resistor for cathode-follower tube 50 establishes the depth of modulation of the output of oscillator 14, insofar as its amplitude modulation is concerned.

Frequency-modulated generator 22 is shown as a square wave oscillator essentially operating as a stable multivibrator, whose repetition frequency can be varied cyclically under control of the frequency modulator 36. Thus, generator 22 comprises the tubes 60 and 62, having their plates and control grids respectively cross-connected in the well-known manner of the multivibrator, plate supply being indicated at 64, and grid bias resistors at 66 and 68. Output coupling is, as stated, via capacitor 54. In order to obtain the very substantial variation in repetition rate of the multivibrator, which is required for this application, a somewhat unconventional control circuit is provided, as will now be described.

Resistors 66, 68 and condensers 70, 72 would normally be the frequency-determining components of the multivibrator. The frequency can be increased by the provision of resistors 74 and 76, connected in series between the control grids of tubes 60 and 62. An increase of ten times over the more usual circuit can readily be achieved, with proper values of resistors 74 and 76. The operating frequency will be found to vary inversely as the total series resistance at this point, and for this reason the resistor 74 is made variable, to establish the lowest end of the swept frequency range. The opposite ends of the series pair are returned to the cathode of the FM modulator tube 78 of modulator 36, the latter tube thus acting as a cathode follower controlling the multivibrator. The use of the more positive potential at the cathode of tube 78 shortens the discharge time of the timing capacitors 70 and 72, thus augmenting the frequency increase obtained.

Finally, the FM modulator section 36, including tube 78, is connected to the output of sweep amplifier 34, of conventional design, via capacitor 80 and adjustable resistor 82, the latter acting as a voltage divider controlling the amplitude of voltage applied from the sweep amplifier 34 to the grid of tube 78. This control therefore sets the highest frequency of oscillation of the FM generator 22. Clamp diode 84 maintains the set value of signal applied to the grid of tube 78. Thus, the two controls 74 and 82 permit the operator to select both the nominal frequency, and the frequency excursion, of the FM generator 22.

The action of the remaining components of FIGURE 4 will be obvious from the above, taken with what has already been said respecting FIGURE 1. It is apparent that the modulation component of the ultrasonic wave generated in the manner described, by the transducer 10, will actuate the specimen 12 and produce an increase in the amplitude of internal vibration when the modulation frequency coincides with the resonant frequency of the specimen. This increase will be detected by receiver crystal 24 and applied to the oscilloscope 30 as already mentioned, to permit a direct indication of actual resonant frequency of the specimen, and over a very wide range of such resonant frequencies, or thicknesses.

I have found that a carrier frequency (oscillator 14) of ten megacycles per second is satisfactory for thickness ranges between one tenth of an inch and ten feet, in steel or aluminum specimens, and that this range requires only a single transducer when the novel technique is employed. Prior art systems would require eight transducers to cover this range, an appropriate one being switched in or substituted for each part of the entire range.

A further advantage of the invention may be seen from an exemplary application in which such a ten megacycle carrier is employed, and in which the maximum bandwidth required for the transducer 10 and the high frequency oscillator 14 is only 2.3 megacycles, for the test range as indicated (0.1 inch to 10 feet). Inasmuch as the fundamental resonant frequency of a sheet of steel one tenth inch thick is approximately 1.145 megacycles per second, it will be seen that no sideband frequency will be more than 11.5 percent from the natural frequency of the transducer transmitting crystal. This permits less damping on the piezoelectric elements of the transducer, with a consequent increase in sensitivity and efficiency. The oscillator 14 bandwidth requirement is easily attained by the relatively high L/C ratio of the tank circuit 40, 42 and the damping resistor 86.

While the invention has been described herein in some detail, by way of example and in compliance with the patent statutes, it will be understood that various modifications and refinements are possible, as will be apparent to those skilled in the art, without departing from the spirit and scope of the invention as defined in the appended claims.

What is claimed is:

1. Apparatus for the ultrasonic inspection of a workpiece, comprising transducer means including separate transmitting and receiving transducer elements having surfaces in a common plane and adapted to be positioned with said surfaces acoustically coupled to the workpiece, a high frequency carrier wave generator connected to energize the transmitting transducer element at substantially the resonant frequency thereof, a sweep-controlled indicator connected to said receiving transducer element, means for amplitude modulating the output of said wave generator to produce substantially square-wave output pulses of carrier frequency therefrom at a repetition frequency lower than the frequency of said carrier, means for frequency-modulating the repetition frequency of said square-wave output pulses to vary their repetition rate cyclically over a frequency range encompassing the resonance frequency of the workpiece being inspected, and sweep control means for concomitantly controlling said indicator and said modulating means to produce an indication at said indicator of the resonance frequency of said workpiece.

2. Apparatus in accordance with claim 1, in which said frequency modulating means comprises a frequency modulated generator having a frequency swing of substantial range which is wholly below the carrier frequency of said high frequency oscillator.

3. Apparatus in accordance with claim 1, wherein said frequency-modulating means includes means for establishing the upper and lower frequency limits defining the range of frequency modulation of said pulses.

4. Ultrasonic inspection apparatus of the type employing an inspection transducer assembly providing mechanically separate transmitting and receiving transducer elements each arranged symmetrically with respect to a common axis, comprising means for energizing the said transmitting element with substantially square-wave electrical pulses of a carrier frequency substantially equal to the natural frequency of such element, means for frequency modulating the repetition rate of said pulses over a frequency range encompassing the resonant frequency of the workpiece being inspected, and which range is a fractional part of the carrier frequency, and means connected to said receiving transducer element for indicating the value of the modulating frequency corresponding to the occurrence of mechanical resonance in the workpiece.

5. Apparatus in accordance with claim 4, in which said indicating means is a frequency sweep oscilloscope, and including means for synchronously controlling the sweep of said indicatnig means and the frequency excursion of the frequency modulating means.

6. Ultrasonic inspection apparatus comprising transducer means, means for energizing said transducer means with substantially square-wave electrical pulses of a carrier frequency substantially equal to the natural frequency of said transducer means, means for frequency modulating the repetition rate of said pulses over a frequency range encompassing the resonance frequency of the workpiece being inspected, and which range is a fractional part of the carrier frequency, and means connected to said transducer means for indicating the value of the modulating frequency corresponding to the occurrence of mechanical resonance in the workpiece.

7. Apparatus for the ultrasonic inspection of a workpiece, comprising transducer means adapted to be acoustically coupled to the workpiece, signal generating means coupled to said transducer means and adapted to supply a signal including a carrier wave amplitude modulated by substantially square-wave pulses, a sweep-controlled indicator connected to said transducer means, means for frequency-modulating the repetition frequency of said square-wave pulses to vary their repetition rate cyclically over a frequency range encompassing the resonance frequency of the workpiece being inspected, and sweep control means for concomitantly controlling said indicator and said frequency-modulating means to produce an indication at said indicator of the resonance frequency of the workpiece.

References Cited in the file of this patent

UNITED STATES PATENTS 2,431,234    Rassweiler et al. _____ Nov. 18, 1947

FOREIGN PATENTS 1,128,966    France _____ Sept. 3, 1956